US007654483B1

(12) United States Patent
Martin et al.

(10) Patent No.: US 7,654,483 B1
(45) Date of Patent: Feb. 2, 2010

(54) DISENGAGABLE ADJUSTABLE DRAG SYSTEM FOR A FISHING REEL

(75) Inventors: David H. Martin, Philadelphia, PA (US); Eric Karl Baisch, Philadelphia, PA (US)

(73) Assignee: Penn Fishing Tackle Manufacturing Co., Philadelphia, PA (US)

( * ) Notice: Subject to any disclaimer, the term of this patent is extended or adjusted under 35 U.S.C. 154(b) by 350 days.

(21) Appl. No.: 11/734,619

(22) Filed: Apr. 12, 2007

(51) Int. Cl.
*A01K 89/02* (2006.01)

(52) U.S. Cl. .................... 242/303; 242/291; 242/245

(58) Field of Classification Search ................. 242/223, 242/303, 224, 243–246, 285, 295, 302
See application file for complete search history.

(56) References Cited

U.S. PATENT DOCUMENTS

| 3,425,644 | A | 2/1969 | Griste |
|---|---|---|---|
| 3,682,411 | A | 8/1972 | Dumbauld |
| 4,488,689 | A | 12/1984 | Councilman |
| 4,516,741 | A | 5/1985 | Hashimoto |
| 4,728,054 | A | 3/1988 | Pisapio |
| 4,742,974 | A | 5/1988 | Furomoto |
| 4,796,828 | A | 1/1989 | Councilman |
| 4,871,129 | A | 10/1989 | Hashimoto |
| 5,063,465 | A | 11/1991 | Fujioka |
| 5,219,131 | A | 6/1993 | Furomoto |
| 5,318,246 | A | 6/1994 | Ikuta |
| 5,601,245 | A | 2/1997 | Hashimoto |
| 5,603,465 | A | 2/1997 | Henriksson |
| 5,803,385 | A | 9/1998 | Baisch |
| 6,053,446 | A | 4/2000 | Henze et al. |
| 6,318,655 | B1 | 11/2001 | Henze |
| D451,576 | S | 12/2001 | Datcuk, Jr. et al. |
| 6,402,073 | B1 | 6/2002 | Datcuk, Jr. |
| 6,827,306 | B1 | 12/2004 | Datcuk, Jr. |
| 6,830,208 | B2 | 12/2004 | Datcuk, Jr. |
| 6,877,686 | B2 | 4/2005 | Datcuk, Jr. |
| 7,017,845 | B2 | 3/2006 | Clark |

FOREIGN PATENT DOCUMENTS

| JP | H04-002269 | 4/1992 |
|---|---|---|
| JP | H04-349837 | 12/1992 |
| JP | H09-217739 | 8/1997 |

OTHER PUBLICATIONS

Penn Fishing Tackle Mfg. Co., "Engineering Drawing No. 30VSX", prior to Apr. 12, 2007, 1pg.
Penn Fishing Tackle Mfg. Co., "Parts List for Model 30VSW", Mar. 13, 2007, 1 page.

(Continued)

*Primary Examiner*—Evan H Langdon
(74) *Attorney, Agent, or Firm*—Clement A. Berard, Esq.; Dann, Dorfman, Herrell & Skillman, PC

(57) ABSTRACT

A fishing reel drag system may comprise a drag housing having a cavity and fixed rotationally relative to a shaft or a spool. A driven member adjacent the cavity is rotatable relative to the drag housing and with the other of the shaft or spool. A drag stack of washers in the cavity includes a plurality of friction washers keyed to the drag housing or the driven member and at least one metal washer keyed to the other of the drag housing or driven member. A cam and follower move the driven member to bias the drag stack for exhibiting friction. A spring biases the drag stack for producing a desired level of friction and an actuator actuates the cam and follower. The actuator may disengage the spool from the drag stack.

39 Claims, 6 Drawing Sheets

OTHER PUBLICATIONS

Penn Fishing Tackle Mfg. Co., "Parts List for Model 525MAG", Dec. 29, 2004, 1 page.

Penn Fishing Tackle Mfg. Co., "2005 Product Catalog", 2005, cover and pp. 3, 8-29.

Patent Cooperation Treaty, "International Search Report", PCT/US2008/060047, Sep. 9, 2008, 3 pages.

DISENGAGABLE ADJUSTABLE DRAG SYSTEM FOR A FISHING REEL

The present invention relates to a drag system arrangement for a fishing reel.

Conventional fishing reels include a drag brake for providing drag or resistance against rotation of the spool when line is being played out so that a fish is tired during the fishing process and therefore may eventually be reeled in and caught. Typically, and preferably, the level of drag provided is adjustable by the fisherman in the course of fishing so that a drag appropriate to circumstances may be obtained. For example, when a line is being played out a relatively low level of drag may be desirable to prevent the spool from getting ahead of the line and causing a tangling of the line. When a fish is hooked, a higher level of drag may be desired so as to allow the fish to run and tire, and that level of drag may be adjusted from time to time as the size of the fish is better estimated and/or as the fish tires.

One known drag arrangement includes a stack of washers of different materials, wherein the washers of one material are fixed in relation to the main gear and the washers of the other material are fixed in relation to the main gear shaft on which the main gear rotates, so that the torque required for relative rotation between the washers generates drag that can be adjusted by changing the axial load placed on the stack of washers. Typically, the washers are a mix of metal washers and fiber washers that exhibit friction when in contact with each other. An adjustment knob, such as a star wheel, is typically provided for adjusting the pressure applied to the stack of washers and therefore the drag level. U.S. Pat. No. 6,318,655 entitled "DRAG APPARATUS FOR CONVENTIONAL AND SPINNING REELS" describes an excellent drag system of this type that is available in certain fishing reels from the Penn Fishing Tackle Manufacturing Company, located in Philadelphia, Pa., and sold under the VERSADRAG® trademark.

Because the foregoing drag system acts on the handle side of the gearing of a conventional reel, the gears thereof are loaded when drag is applied and the gear ratio acts in a direction that reduces the drag level at the spool of the reel.

Another known drag arrangement of a different type is a centrifugal drag system wherein a number of brake members are supported by a structure affixed to the reel and wherein the brake members are movable radially under the influence of centrifugal force when the spool spins to come into contact with a brake shoe, as when line is playing out. Typically, a user may adjust the level of drag in steps using a control that changes the number of brake members that are enabled to move radially outward. Thus, if four brake members are enabled to be movable radially, one would obtain two times the drag that would obtain if only two brake members were so enabled. U.S. Pat. No. 5,803,385 entitled "CENTRIFUGAL BRAKE SYSTEM FOR FISHING REEL" describes an excellent drag system of this type that is available in certain fishing reels from Penn Fishing Tackle Manufacturing Company.

Another known drag arrangement is a drag system wherein one brake member is affixed to the reel and a second brake member is affixed to the spool and is rotatable therewith. In a typical example, a metal brake member is affixed to the spool and a fiber brake member is affixed to the reel frame. When the two brake members are pressed into contact, e.g., by a spring, friction is developed at the interface between the two brake members to develop drag against the playing out of line when the spool spins.

While this latter arrangement has the advantage that the drag is developed at the spool and so is not reduced by the gear ratio, it has only one metal washer in the set of brake members and so there is usually only one interface, or at most two interfaces, therebetween at which to develop friction and drag. Further, because this conventional arrangement operates by friction produced at a brake element attached to the spool, the frictionally produced heat typically causes thermal expansion of the spool which can produce a relatively high axial loading of the spool bearings and may cause a noticeably higher force to be required to rotate the handle of the reel at higher drag levels. Relief of the axial bearing loading caused by such thermal expansion in the bearing system that supports the spool may be accommodated by a more complex spool bearing arrangement. U.S. Pat. No. 6,053,446 entitled "DRAG SYSTEM FOR ACCOMMODATING THERMAL EXPANSION" describes an excellent drag system of this type that is available in certain reels from Penn Fishing Tackle Manufacturing Company.

Accordingly, there is a need for a drag arrangement that produces drag at the spool and that could provide, if desired, a greater level of drag than is provided by known drag systems. In addition, it would be desirable that such drag arrangement could allow the spool to spin freely if and when desired.

To this end, a drag system may comprise: a drag housing having an axial cavity, wherein the drag housing is fixed rotationally relative to one of the shaft and the spool; a driven member rotatable relative to the drag housing, wherein the driven member is rotatable with the other of the shaft and the spool; a drag stack of washers in the cavity including a plurality of friction washers and at least one metal washer; wherein the friction washers are keyed to one of the drag housing and the driven member, and wherein the at least one metal washer is keyed to the other of the drag housing and the driven member; a cam and follower actuatable for moving the driven member axially to bias the drag stack for pressing the washers thereof together for exhibiting friction; a spring for applying bias to the drag stack for producing a desired level of friction; and an actuator movable for actuating the cam and follower for moving the one of the driver member and driven member axially.

According to another aspect, a fishing reel drag system cartridge may comprise: a drag housing having an axial cavity; a driven member rotatable relative to the drag housing; a drag stack of washers in the cavity including a plurality of friction washers and at least one metal washer; wherein the friction washers are keyed to one of the drag housing and the driven member, and wherein the at least one metal washer is keyed to the other of the drag housing and the driven member; and a retainer for retaining the drag stack and the driven member with the drag housing.

BRIEF DESCRIPTION OF THE DRAWING

The detailed description of the preferred embodiment(s) will be more easily and better understood when read in conjunction with the FIGURES of the Drawing which include.

Figure 1A:
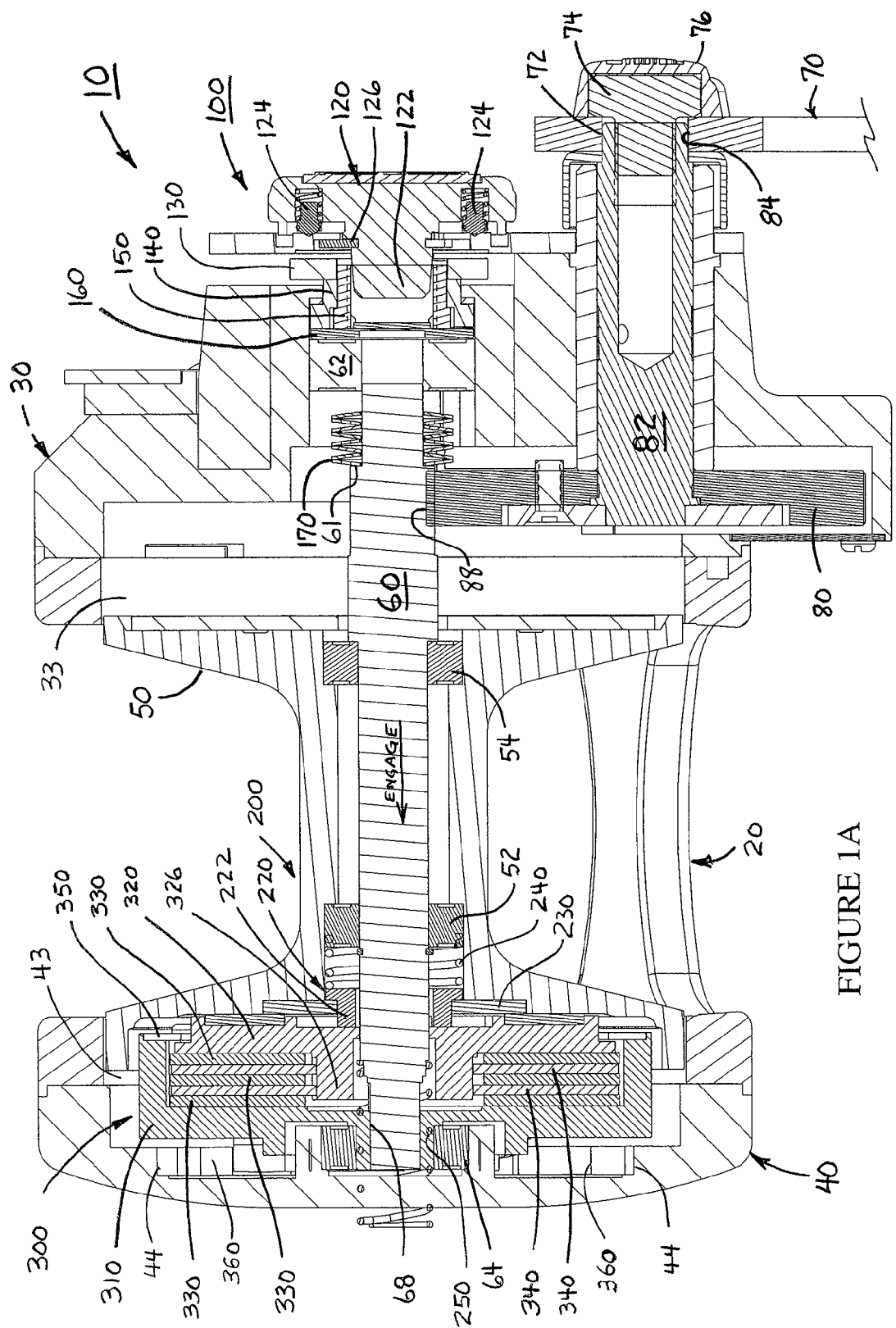
FIGS. 1A and 1B are cross-sectional views of an example embodiment of a fishing reel including a drag system according to the present arrangement.

In the Drawing, where an element or feature is shown in more than one drawing figure, the same alphanumeric designation may be used to designate such element or feature in each figure, and where a closely related or modified element is shown in a figure, the same alphanumerical designation primed or designated "a" or "b" or the like may be used to designate the modified element or feature. Similarly, similar elements or features may be designated by like alphanumeric designations in different figures of the Drawing and with similar nomenclature in the specification. It is noted that, according to common practice, the various features of the drawing are not to scale, and the dimensions of the various features are arbitrarily expanded or reduced for clarity, and any value stated in any Figure is given by way of example only.

DESCRIPTION OF THE PREFERRED EMBODIMENT(S)

A drag system for a fishing reel according to the present arrangement provides an adjustable level of drag on the spool wherein the drag may be provided by a drag stack including intermixed friction imparting washers and metal washers, and wherein the drag system may optionally be disengaged to permit free rotation of the spool. Two drag actuators that may be operated independently may be provided for adjusting the drag level in a continuous fashion and for adjusting the drag level in predetermined increments or steps.

Figure 1B:
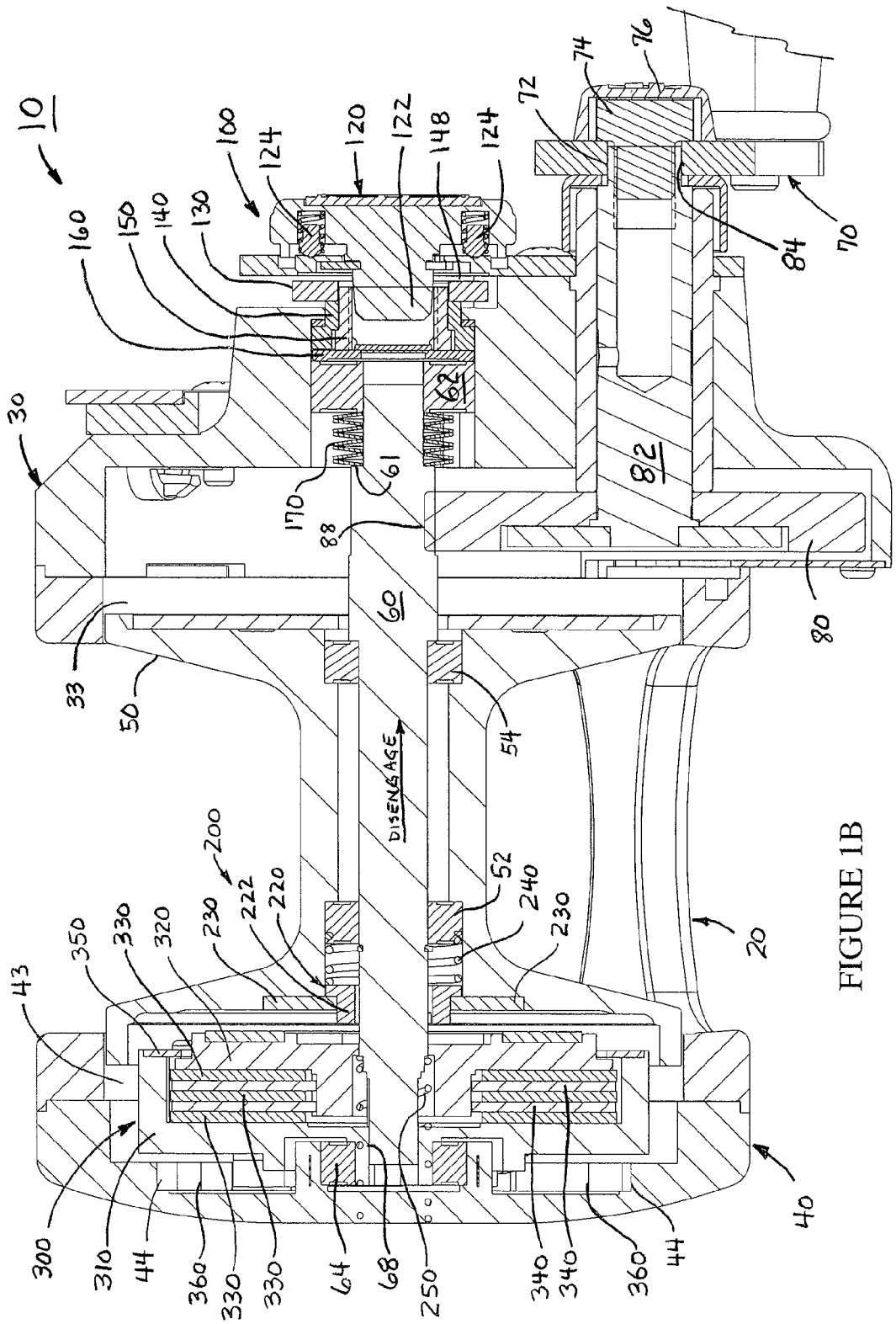

FIGS. 1A and 1B are cross-sectional views of an example embodiment of a fishing reel 10 including a drag system 100, 200, 300 according to the present arrangement. Fishing reel 10 comprises a frame 20 on which are assembled a right side plate assembly 30 and a left side plate 40, and through which is a main shaft 60 on which is mounted spool 50. Spool 50 is rotatably supported by spool bearings 52 and 54, and shaft 60 is rotatably supported by shaft bearings 62 and 64. Reel 10 includes a crank handle 70 and gearing 80 associated with right side plate assembly 30 for causing shaft 60 and thus spool 50 to rotate for winding fishing line onto spool 50, e.g., as when reeling in a fish.

Reel 10 includes a drag system actuator 100 in right side plate assembly 30 for actuating drag system 200, 300. Actuator 100 preferably includes a drag adjustment lever 130 for adjusting the level of drag over a predetermined range with fine adjustment and a preset knob 120 for adjusting the level of drag in discrete steps. Reel 10 further includes a drag system drive arrangement 200 for coupling spool 50 to drag brake cartridge 300 (also referred to herein as drag mechanism 300) for providing an adjustable level of frictional drag. Drive arrangement 200 also preferably provides the option of disconnecting drag brake cartridge 300 from spool 50 so that spool 50 is freely rotatable.

Drag system 100, 200, 300 is shown in an engaged condition in FIG. 1A because shaft 60 is moved (leftward) toward drag mechanism 300 in left side plate assembly 40, thereby to engage drive arrangement 200 and drag mechanism 300 so that rotation of spool 50 causes rotation of part of drag mechanism 300. Drag system 100, 200, 300 is shown in a disengaged condition in FIG. 1B because shaft 60 is moved (rightward) away from drag mechanism 300 and toward right side plate assembly 30, thereby to disengage drive arrangement 200 so that drag mechanism 300 and spool 50 are disengaged and spool 50 may freely rotate without rotating drag mechanism 300.

Right side plate assembly 30 has a recess or cavity 33 and left side plate assembly 40 has a recess or cavity 43 so that spool 50 may be moved axially (from side to side) in frame 20, e.g., as shaft 60 is moved axially in frame 20, for engaging and disengaging drive arrangement 200 from drag mechanism 300, and for adjusting the level of drag that may be provided by drag mechanism 300. In the example illustrated, e.g., in FIGS. 1A and 1B, spool 50 and shaft 60 are so interconnected that both move together axially, except for such play and tolerance as might exist in spool support bearings 52, 54 and in the various retainers therefor, however, spool 50 and shaft 60 do not rotate together under all conditions.

Preferably, drag mechanism 300 has one or more dogs 360 on the left hand outer end thereof, e.g., on drag housing 310 thereof, and the one or more dogs 360 engage a ratchet 44 on left side plate assembly 40 so that drag housing can rotate in only one direction relative to left side plate assembly 40 and reel 10. Drag housing 310 receives a spline 68 of shaft 60 and so is constrained to rotate therewith. Anti-reverse dogs 360 prevent spool 50 and handle 70 from rotating backwards whether or not the drag is engaged.

Thus, handle 70 can be turned only in one direction, i.e. the direction that rotates gear 80 and main shaft 60 which in turn rotates drag housing 310 and, via driven member 320 and driver arrangement 200, rotates spool 50 for reeling in line. However, if the force exerted on the line exceeds the drag level setting provided by drag mechanism 300 responsive to the settings of drag preset knob 120 and drag lever 130, then dogs 360 will prevent reverse rotation of drag housing 310 and spool 50 will rotate in the direction to allow line to play out with the then set drag setting.

Advantageously, anti-reversing dog 360 may be on drag housing 310 and anti-reversing ratchet 44 may be on side plate assembly 40, thereby to be at a greater radius from shaft 60 in the present arrangement than is found in a known reel having a spool mounted drag arrangement. As a result, dogs 360 and ratchet 44 can withstand a greater load than they could if located at a shorter radius, i.e. closer to shaft 60. In addition, the present arrangement may produce a "freer feel" for the fisher when cranking the handle 70 because of the plurality of drag surfaces and may impose less axial loading on the spool bearings than do prior art arrangements.

Each of the foregoing elements of the drag system of fishing reel 10 are further described below in relation to FIGS. 2, 3 and 4 which descriptions should be read in conjunction with FIGS. 1A and 1B. It is noted that movement of actuator 100 to adjust the level of drag is coupled to drag brake cartridge 300 via shaft 60 being moved toward and away from left side plate assembly 40, and in certain positions of drag system actuator 100, drag brake cartridge 300 may be released from spool 50 by drag system drive arrangement 200.

Figure 2:
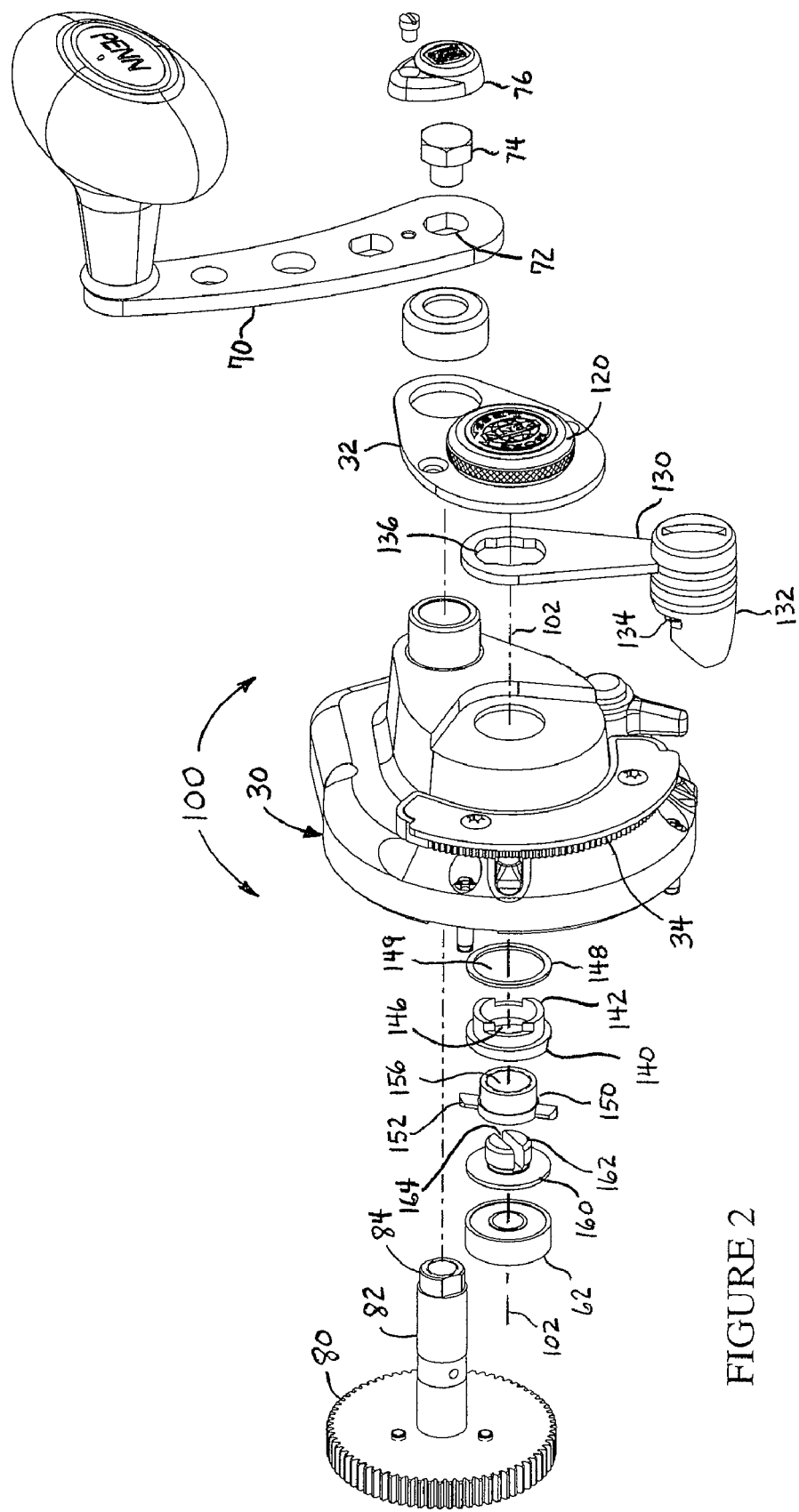
FIG. 2 is an exploded view of an example embodiment of a control lever arrangement for the example drag system of the example fishing reel of FIGS. 1A and 1B.

FIG. 2 is an exploded view of an example embodiment of a control lever arrangement 100 for the example drag system 100, 200, 300 of the example fishing reel 10 of FIGS. 1A and 1B, and the following description should be read in conjunction with those FIGURES. A drag actuator 100 resides in right side plate assembly 30 along with certain elements useful for reeling in line onto spool 50 of fishing reel 10. Drag actuator 100 receives rotational actuation from a user, e.g., by rotation of either or both of preset knob 120 and drag lever 130, and converts such rotational inputs into axial movement of shaft 60 (not shown in FIG. 2) for affecting engagement and disengagement of spool clutch arrangement 200 with drag cartridge 300 and for changing the drag levels provided by drag cartridge 300, which are described below.

Crank and handle 70 has a hole 72 therein that receives and engages spline 84 of main gear shaft 82 on which is mounted main gear 80, so that the cranking of handle 70 causes main gear 80 to rotate which in turn is coupled via a geared interface 88 to shaft 60 to cause shaft 60 and spool 50 to rotate, e.g., for reeling in line onto spool 50, as when reeling in a fish. Handle 70 is attached to gear shaft 82 by a bolt 74 which is covered by a trim plate or cap 76, as is conventional. The geared interface 88 between main gear 80 and shaft 60 may be provided by gear teeth on shaft 60 or by a pinion gear on shaft 60, as may be convenient for providing a desired gearing ratio between handle 70 and spool 50.

Drag actuator 100 includes plural elements that are either coaxial with centerline 102 of main shaft 60 or that are rotatable about such centerline 102. Shaft 60 is rotatable with and is supported by bearing 62. Drag lever 130 is rotatable about centerline 102 for setting a desired level of drag, e.g., is rotatable over an arc of about 90° or another convenient angle. Drag lever 130 includes a lever knob portion 132 providing a convenient grip for a user, and lever knob 132 optionally has a detent member 134 that engages optional detent teeth 34 of side plate assembly 30. Detent teeth 34 are on an arc (a segment of a circle) that is coaxial with centerline 102, as is detent member 134 of lever knob 132. As a result, detent teeth 34 and detent member 134 tend to retain drag lever 130 in a position into which it is placed and further provide a clicking as drag handle 130 is rotated to adjust the drag level, thereby to provide audible and/or tactile feedback to a user.

Moving drag lever 130 over a rotational angle, i.e. rotating drag lever 130, causes relative rotation of cam 140 relative to cam follower 150 so that the rotational movement of drag lever 130 is converted to axial movement along centerline 102 of shaft 60. Cam 140 has a shaped boss 142 that engages non-circular opening 136 of drag lever 130 so as to cause cam 140 to rotate clockwise and counterclockwise with lever 130. Cam 140 is positioned coaxially with shaft 60 and is spaced by annular spacer 148, which may be of TFE, PTFE, nylon, or another suitable material, for reducing friction that may be caused by axial loading between shaft 60 and cam 140.

Cam 140 has an axially inclined cam surface 144 on the end thereof facing cam follower 150, and so that cam follower 150 will move axially to follow the inclined surface 144 when cam 140 is rotated. Follower 150 extensions 152 also engage right side plate assembly 30 to prevent cam follower 150 from rotating about centerline 102 so that the axial position of follower 150 is responsive to rotation of cam 140. Thus, axial movement of shaft 60 for adjusting the level of drag, and/or for selectively disengaging spool 50 from shaft 60, is produced responsive to rotational actuation of drag lever 130.

Cam follower 150 is threadingly coupled to an adjusting screw 160 so that rotation of adjusting screw 160 causes axial movement of bearing 62 which in turn moves shaft 60 axially. Boss 162 of adjusting screw 160 has external threads that engage internal threads of cam follower 150 so that when one is rotated relative to the other the effective axial thickness of cam follower 150 and adjusting screw 160 increases or decreases thereby to produce axial movement of shaft 60 so as to adjust the level of drag. While cam follower 150 does not rotate, adjusting screw 160 is rotatable because boss 162 thereof is notched, e.g., by slot or notch 164 on threaded boss 162, and notch 164 is coupled to preset knob 120.

Drag level preset knob 120 has a projecting tang 122 that extends into slot 164 to engage adjusting screw 160, so that adjusting screw 160 is coupled to and rotates with preset knob 120 and so that adjusting screw 160 rotates relative to cam follower 150. Thus, rotating preset knob 120 over a given angle (which may be less than or more than 360°) causes adjusting screw 160 to rotate over the same angle relative to cam follower 150, so that rotational movement of preset knob 120 produces corresponding axial movement of cam follower 150. Because shaft 60 is urged rightward by spring 250 so that its right end slips into the central opening of bearing 62 and shoulder 6i bears against spring 170 which in turn bears against bearing 62 and adjusting screw 160, rotational movement of preset knob 120 and adjusting screw 160 changing the combined axial length of cam follower 150 and adjusting screw 160 produce corresponding axial movement of bearing 62 to change the bias applied to shaft 60 by spring 170.

Drag level preset knob 120 of drag actuator 100 also includes a detent that acts when knob 120 is rotated. While such detent could be arranged for changing the drag level in discrete increments or steps corresponding to the detent steps, it may also have a relatively fine detent to provide a clicking when knob 120 is rotated, thereby to provide an audible and/or tactile feedback to a user. Drag preset knob 120 is attached to and is rotatable with respect to cover 32 of right side plate assembly 30 and is detented at desired rotational locations by spring loaded detent plungers 124 therein. Preset knob 120 may be retained to cover 32 by a retainer ring 126 or other suitable means, and cover 32 is attached to side plate 30 by screws (not shown). Cam 140 and spacer 148 have respective central openings 146, 149 into which boss 162 of adjusting screw 160 and projecting tab or tang 122 of knob 120 extend for engaging therein. This push-to-turn presetting feature provides for adjustment of drag in discrete increments, and an example embodiment thereof is described in U.S. Pat. No. 6,827,306 entitled "PUSH TO TURN LOCKING PRESET KNOB FOR FISHING REEL" which is hereby incorporated by reference herein in its entirety.

Thus, rotation of drag level preset knob 120 and/or rotation of drag lever 130 produce changes in the level of drag in predetermined ranges, thereby to produce drag characteristics as described below in relation to the graphical representation of FIG. 5. Typically, the pitch of the threads of adjusting screw 160 is substantially less than the pitch of the cam surface of cam 140 and so a much greater drag change may be effected by rotating drag lever 130 over its full range of positions, e.g., typically about a 90° angle, than can be made by rotating preset knob 120. Drag lever 130 and drag level preset knob 120 are operable independently for independently, but cooperatively, adjusting the level of drag produced by drag arrangement 100, 200, 300, in a desired amount. Typically, prior to fishing a user would adjust preset knob 120 to provide a desired level of drag at a particular position of drag lever 130 and would then while fishing adjust the drag level using drag lever 130 to increase or decrease the drag relative to the drag at the particular position of drag lever 130. As a result, the drag level is repeatable whenever drag lever 130 is returned to the particular position.

Figure 3:
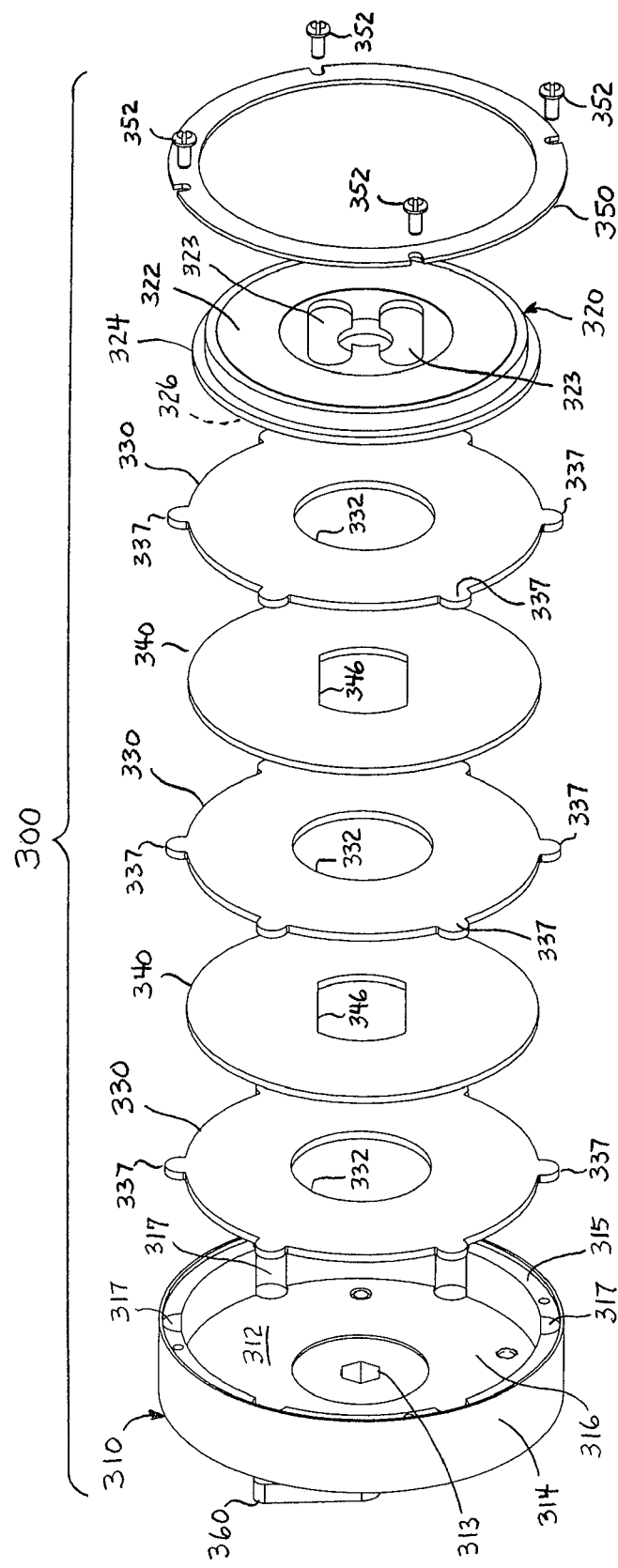
FIG. 3 is an exploded view of an example embodiment of a drag cartridge arrangement of the example fishing reel of FIGS. 1A and 1B.

FIG. 3 is an exploded view of an example embodiment of a drag stack cartridge 300 of example drag system arrangement 100, 200, 300 of the example fishing reel 10 of FIGS. 1A and 1B, and the following description should be read in conjunction with those FIGURES. Drag stack cartridge 300, also referred to as drag mechanism 300, includes a stack of differing types of washers that rotate relative to one another so as to produce frictional drag when spool 50 rotates relative to left side plate 40.

Preferably drag stack arrangement 300 is provided as a drag stack cartridge 300 that may be removed as a unit for adjusting the drag level range and/or for repair or replacement, but it need not be so provided. Drag cartridge 300 includes a drag housing 310 having a base 312 and a wall 314 extending from base 312 to define a cavity 316 in which may be disposed a stack of drag washers 330, 340. Drag washers 330, 340 are contained in drag housing 310 by driven member 322 which provides a cover-like closure that fits within cavity 316 and which is rotatable relative to drag housing 310. Drag housing 310 has a splined opening 313 in the base 312 thereof for receiving shaft 60 therein, specifically for receiving the spline 68 at the left end of shaft 60 therein. Drag housing 310 also has one or more dogs 360 for limiting rotation of drag housing to one direction.

Driven member 320 has a base 322 and a flange 324 extending therefrom. Preferably, drag housing 310 and driven member 320 are generally circular so that driven member 320 is rotatable in cavity 316 of drag housing 310 and base 322 thereof provides a drag surface adjacent one washer 330. Driven member has a boss 326 extending towards drag housing 310, and boss 326 is keyed for engaging washers 340 at their openings 346. Optionally, driven member 320 is retained in drag housing 310 by a retaining ring 350 that sits in circular recess 315 of drag housing 310 and is attached thereto by screws 352, and when driven member 320 is moved rightward, flange 324 thereof engages retaining ring 350 and base 322 of driven member 320 extends in to the central opening of ring 350.

Drag washers 330, 340 are preferably of two different types, ones having a high coefficient of friction at an interface therebetween, so as to produce substantial friction when in contact with each other and subjected to relative motion, e.g., relative rotation. To this end, one type of drag washers 330, 340 have features that engage with corresponding features of drag housing 310 so as to be stationary with respect to drag housing 310 and rotatable with respect to driven member 320, and the other type of drag washers 340, 330 have features that engage with corresponding features of driven member 320 so as to be stationary with respect to driven member 320 and rotatable with respect to drag housing 310. Thus rotation of driven member 320 relative to drag housing 310 will produce relative rotational motion between the two types of drag washers, thereby to generate frictional drag therebetween. For example, an interface between a graphite friction material washer and a stainless steel washer will have a coefficient of friction "μ" of about 0.7, and an interface between two metal washers will have a coefficient of friction "μ" that is typically in the range of about 0.15 to 0.60.

In the illustrated example, drag washers 330 are flat and generally circular, and have projecting tabs or ears 337 extending outwardly for engaging axial keying slots or recesses 317 in wall 314 of drag housing 310, although any other suitable type of keying may be employed so that washers 330 are keyed to rotate with drag housing 310. Thus, washers 330 can not rotate relative to drag housing 310. Washers 330 typically have a centrally located opening 332, which is of a size and shape that will not engage boss 326 of driven member 320 when boss 326 is in opening 332. Opening 332 may be and preferably is circular. Washers 330 provide an annular contact surface on each side thereof that can be in contact with another washer in a stack of washers 330, 340.

Also in the illustrated example, drag washers 340 are flat and generally circular and so have a peripheral shape that permits their rotating relative to drag housing 310, and have a keyed centrally located opening 346 although any other suitable type of keying may be employed. Driven member 320 has a keying boss 326 (keying boss 326 is not visible in FIG. 3) extending through the keyed openings 346 toward drag housing 310 so as to engage washers 340 so that washers 340 rotate with driven member 320. Keying boss 326 has a cross-sectional shape that matches the shape of openings 346, thereby to engage washers 340. Thus, washers 340 can not rotate relative to driven member 320. Washers 340 provide an annular contact surface on each side thereof that can be in contact with another washer in a stack of washers 330, 340.

When washers 330, 340 are stacked in a drag mechanism or cartridge 300, washers 330 are rotationally fixed with respect to drag housing 310 and washers 340 are rotationally fixed with respect to driven member 320, so that when driver arrangement 200 engages with drag mechanism 300, rotation of spool 50 produces rotation of washers 340 relative to washers 330 and drag housing 310. In one example embodiment, one of washer types 330, 340 is preferably a graphite material washer and the other of washer types 330, 340 is preferably a metal washer so that when stacked, the annular surfaces of the washers of one type are in contact with the annular surfaces of the washers of the other type, thereby to exhibit a high coefficient of friction, and their relative rotation produces friction and drag.

As a result, frictional drag is provided and the level of drag is related to the force or pressure with which the washers 330, 340 are pressed together. The force with which washers 330, 340 are pressed together is provided via spring 170 being compressed by drag actuator 100, e.g., by the expansion and contraction of the distance between the (right) side of cam 150 that bears against spacer 148 and the (left) side of adjusting screw 160 that bears against shaft bearing 62. As described above, expansion and contraction of that distance is effected by the operation (rotation) of drag preset knob 120 and of drag lever 130 acting through cam 140, cam follower 150 and adjusting screw 160.

In addition to the level of drag being adjustable responsive to operation of drag actuator 100, the range of drag levels available may be adjusted by changing the number and/or ordering of the two types of washers 330, 340 in the stack. As illustrated, there are three of eared washers 330 and two of circular washers 340 alternatingly interleaved, and so there are five drag producing annular interfaces between friction washers and metal washers (the base 322 of driven member 320 provides a metal surface in contact with the adjacent washer 330), thereby to provide a relatively high range of drag levels. If one of washers 330 were to be removed or interchanged with an adjacent washer 340, then two washers 330 will be adjacent and two washers 340 will be adjacent, and so there will be three drag producing annular interfaces between friction washers and metal washers or surfaces, thereby to provide a relatively lower range of drag levels. If an additional alternating pair of washers 330, 340 were to be added, then there would be seven drag producing annular interfaces between friction washers and metal washers, thereby to provide a relatively very high range of drag levels. Further, washers 330, 340 could be arranged to provide one drag producing annular interface, e.g., a relatively very low range of drag levels.

In one preferred arrangement, washers 330 are friction washers, e.g., of a graphite fiber composite, and washers 340 are of a metallic material, e.g., of a stainless steel or other steel. Examples of suitable graphite fiber composite and other drag producing material and example washer arrangements are described in U.S. Pat. No. 6,318,655 entitled "DRAG APPARATUS FOR CONVENTIONAL AND SPINNING REELS" and 7,017,845 entitled "DRAG MATERIAL AND APPARATUS FOR FISHING REELS" both of which are hereby incorporated herein by reference in their entireties.

In one example embodiment of reel 10, graphite fiber drag washers 330 have a diameter of about 51.8 mm (about 2.04 inches) and a thickness of about 1.27 mm (about 0.05 inch), and stainless steel metal drag washers 340 have a diameter of about 51.6 mm (about 2.03 inch) and a thickness of about 11.14 mm (about 0.045 inch). In this example, preset knob 120 produces an axial movement of shaft 60 of about 0.79 mm (about 0.031 inch) per 360° rotation and drag lever 130 produces an axial movement of shaft 60 of about 2.18 mm (about 0.086 inch) over an about 90° range of rotation of drag lever 130.

While "drag" could be measured in different ways, one way to measure "drag" in a fishing reel is by measuring the force needed to pull line from a "full" spool of line. The force or "drag" may be measured with a spring scale or other measurement device. Applicant considers a spool to be "full" when the line is about ⅛ inch (0.125 inch; about 3.18 mm) from the top of the spool, i.e. from the outer diameter of the flange of the spool. For an example embodiment of reel 10 having a spool 50 whose flange 58 diameter is about 2.63 inches (about 6.68 cm), the "drag" measurement is made with line filling spool 50 to a diameter of about 2.38 inches (about 6.0 cm). Of course, the precision to which the radius at which line is pulled at the "full" condition can be controlled is limited, and the value of "drag" typically increases proportionately as line plays out from spool 50 thereby reducing the radial dimension at which the line exits from spool 50.

For the example embodiment of reel 10 described in the immediately preceding two paragraphs, typical approximate example values of "drag" that might be obtained at various settings and conditions, including a relatively high setting of preset knob 120, are set forth in the following table:

| Drag Washer Configuration | Drag Lever Position | Drag |
| --- | --- | --- |
| 5 Interfacing Surfaces: | Strike | 30 lbs (13.6 Kg) |
|  | Full Drag | 45 lbs (20.4 Kg) |
| 3 Interfacing Surfaces: | Strike | 18 lbs (8.2 Kg) |
|  | Full Drag | 27 lbs (12.3 Kg) |
| 1 Interfacing Surface: | Strike | 6 lbs (2.7 Kg) |
|  | Full Drag | 9 lbs (4.1 Kg) |

In that example embodiment for the condition wherein drag washers 330, 340 are arranged to present five interfacing surfaces, the "drag" obtained when drag lever 130 is in the "strike" position can be varied over a range of about 5-40 pounds (about 2.3-18.2 Kg) by changing the setting of preset knob 120. The "strike" position of drag lever 130 is typically set by a fisher at about ⅔ to ¾ of its full rotational range, and the "Full Drag" position thereof is at full rotation of drag lever 130. In the present example reel 10 wherein drag lever 130 has about 90° of rotation, the strike position would be, e.g., at about 60° of rotation of drag lever 130. In other example reels 10 wherein drag lever 130 has about 120° of rotation, the strike position would be, e.g., at about 80-90° of rotation of drag lever 130. Minimum drag and/or disengagement of drag system 100, 200, 300 is provided at 0° of rotation of drag lever 130. It is noted that it is relatively common in the fishing reel industry to state drag in terms of "pounds" in English system units and in terms of "kilograms" in SI units, even though kilograms is technically a unit of mass, not force.

Figure 4:
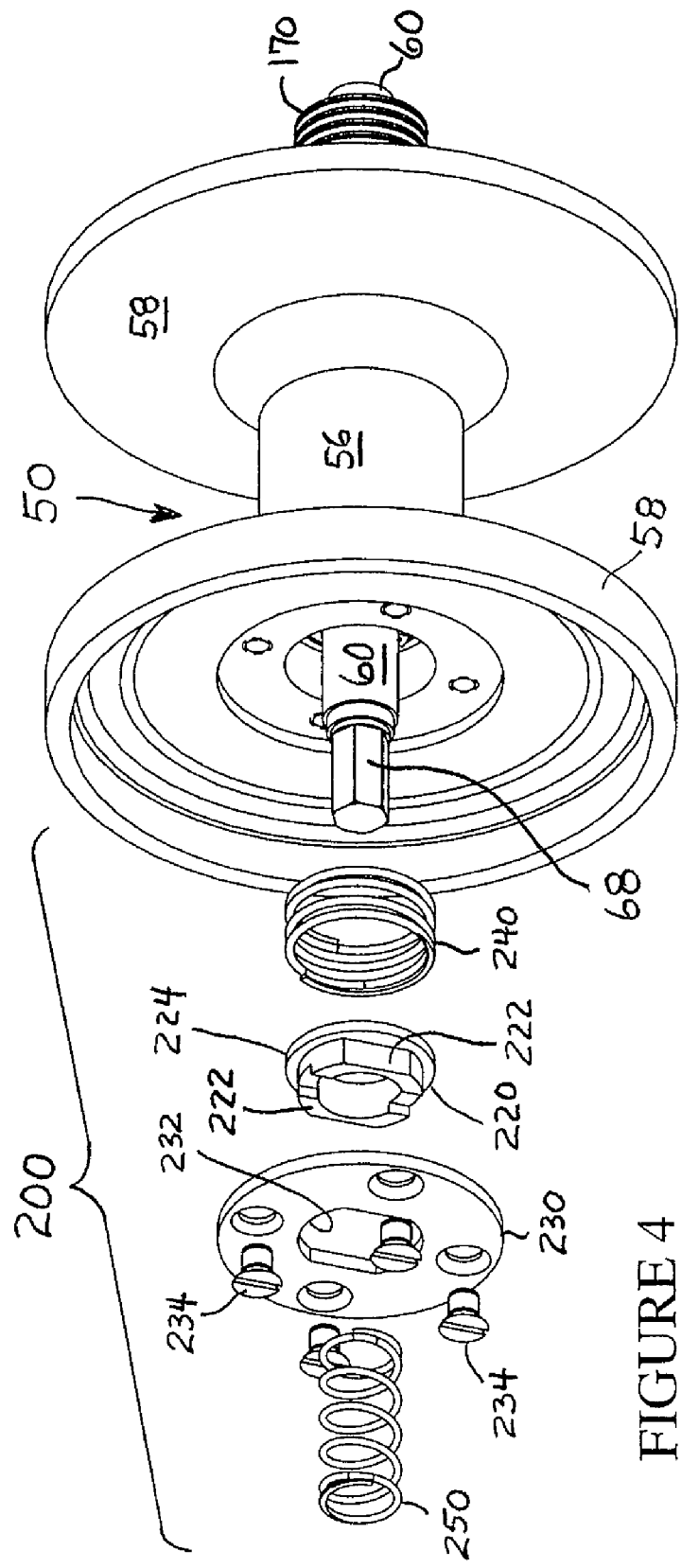
FIG. 4 is an exploded view of an example embodiment of a spool clutch arrangement for the example drag system of the example fishing reel of FIGS. 1A and 1B.

FIG. 4 is an exploded view of an example embodiment of a disengagable spool clutch arrangement 200 for the example drag system 100, 200, 300 of the example fishing reel 10 of FIGS. 1A and 1B, and the following description should be read in conjunction with those figures. Spool 50 includes two circular flanges 58 and an arbor 56 in which shaft 60 is disposed for supporting spool 50 on spool bearings 52, 54, and spool 50 need not be axially movable relative to shaft 60. Spool 50 also has a disengagable driver arrangement 200 in one of circular sides 58, typically the side proximate left side plate assembly 40 which contains drag mechanism 300, so that spool 50 may be selectively disengaged from drag mechanism 300. A spring 170, such as a Belleville washer spring 170, at the right or handle end of shaft 60 bears against a shoulder of shaft 60 for urging shaft 60 towards drag mechanism 300 for producing drag therein.

Disengagable driver arrangement 200 includes an axially movable driver member 220 that is held adjacent to spool 50 with a limited range of axial movability by retainer plate 230 which is attached to spool 50 by screws 234. Projecting boss 222 of driver member 220 fits into keyed opening 232 of plate 230 in a keyed manner so that driver member 220 and spool 50 must rotate together because driver member 220 is seated within opening 232 of retainer plate 230 and is keyed therewith, and plate 230 is attached to spool 50 by screws 234.

Spring 240 surrounds shaft 60 between driver member 220 and spool 50 for biasing boss 222 of driver member 220 fully into plate 230, e.g., until flange 224 of driver member 220 is against plate 230. This allows driver member 220 to move axially as may be needed when driver arrangement 200 is disengaged from driven member 320 of drag mechanism 300 when shaft 60 is moved fully rightward and is then moved leftward to re-engage driven member 320, but the keyed boss 222 of driver member 220 does not align with the keyed opening 323 of driven member 320. In this circumstance, driver member 220 is pushed towards spool 50 by driven member 320 (but boss 220 remains in opening 232 and keyed with plate 230 and spool 50) until such time as driven member 320 or driver member 220 rotates sufficiently to bring boss 222 into alignment with opening 323, whereupon spring 240 moves driver member 220 and boss 222 thereof leftward into opening 323 of driven member 320, thereby to engage driver member 220 attached to spool 50 and driven member 320 of drag mechanism 300 to rotate together.

Spring 250 surrounds spline 68 of shaft 60 and bears on a shoulder thereof to urge shaft 60 rightward to maintain the right end of shaft 60, e.g., shoulder 61, in contact with drag spring 170 and bearing 62 which bears against adjusting screw 160, whereby movement of adjusting screw 160 effects axial movement of shaft 60 to adjust the level of drag. Drag spring 170 determines the slope of the drag characteristic. To this end, spring 250 is typically a weaker spring than is spring 170. Spline 68 here visible engages drag housing 310 so that drag housing 310 rotates with shaft 60 and so that relative motion between spool 50 and drag housing 310 produces drag when driven member 320 engages driver member 220.

Figure 5:
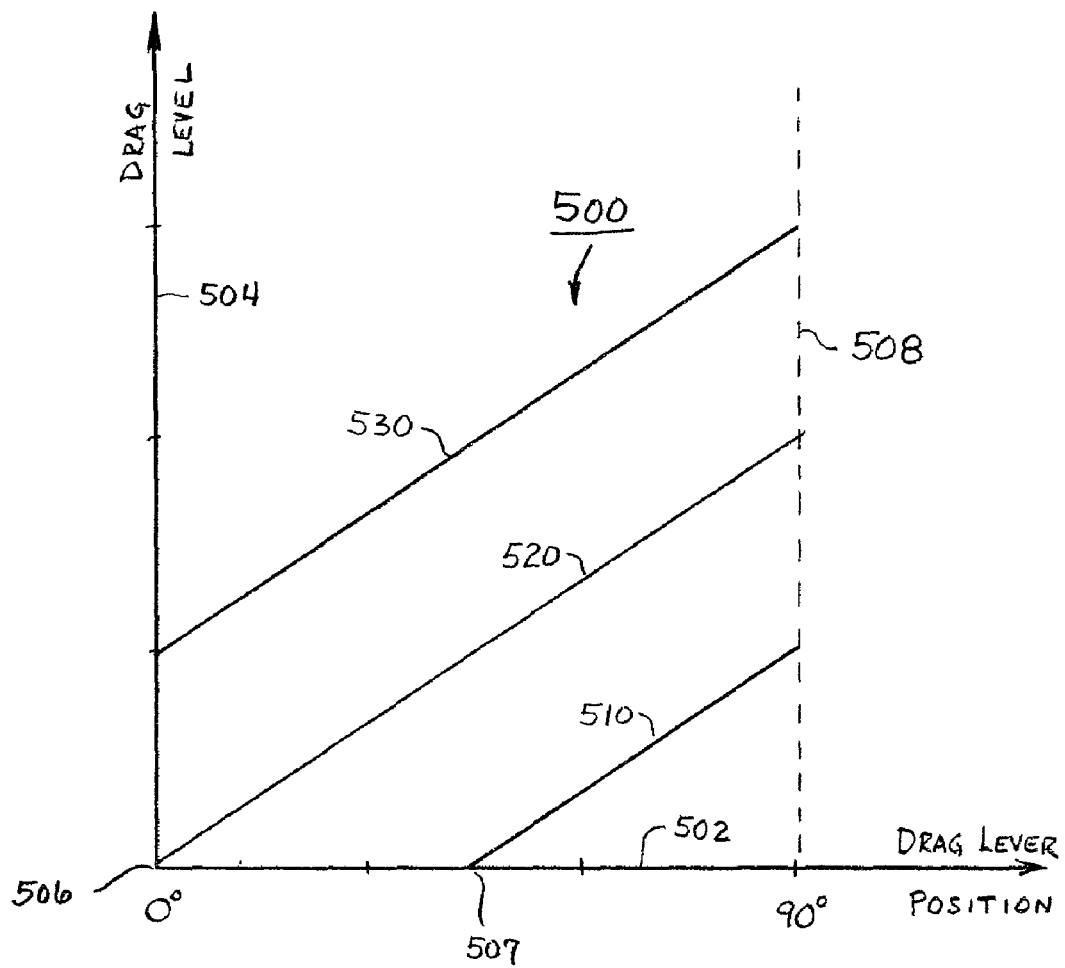
FIG. 5 is a graphical representation of an example drag characteristic that may be provided by the example drag system herein.

FIG. 5 is a graphical representation of a simplified example drag characteristic 500 that may be provided by the example drag system 100, 200, 300 described herein. Drag characteristic 500 is represented graphically in an X-Y coordinate plot wherein the X axis 502 represents the angular position, e.g., in degrees of rotation, of drag lever 130 and the Y axis 504 represents the level of drag, e.g., in pounds of force, produced by arrangement 100, 200, 300. Origin 506 represents drag lever 130 being rotated fully to its "no drag" or "minimal drag" position.

Lines 510, 520 and 530 represent typical selected drag characteristics that may be produced when drag level preset knob 120 is in three different drag level positions, e.g., in a minimal drag level, an intermediate drag level and a maximum drag level producing rotational detent positions, respectively. This simplified example illustrates three drag level characteristics selected by way of example from an larger number of drag level detent positions for preset knob 120.

Typically, however, a larger number of detent positions are typically provided, e.g., 20-50 detent positions, more typically 30-45 detent positions, as may be desired.

The slopes of lines 510, 520, 530, and indeed of all of the drag characteristics that are provided at detent positions of preset knob 120, have substantially the same slope which is determined by the spring constant of drag spring washers 170. To change the drag characteristics, e.g., to change the slope of lines 510-530, drag spring washers 170 may be removed and replaced with spring washers of greater or lesser spring constant values to correspondingly increase or decrease, respectively, the slope of characteristics 510, 520, 530. In addition, the slope of lines 510-530 may be changed by changing the number and/or ordering of washers 330, 340 of drag mechanism 300 in a way that changes the number of friction producing interfaces between washers 330, 340.

With drag level preset knob 120 in its minimal drag level detent position, or in the lower end of the range of drag level positions, there is no drag when drag lever 130 is at a rotational angle between origin 506 and angular rotation 507, and there is a linearly increasing drag level as drag lever 130 is rotated further beyond angular position 507 up to its maximum rotation as indicated by the vertical dashed line 509. There is no drag in angular positions between points 506 and 507 because driver arrangement 200 preferably disengages spool 50 from drag mechanism 300 over this range of angular rotation of drag lever 130, and there may also be angular positions that produce no drag or essentially no drag even after there is some engagement of spool 50 and drag cartridge 300.

With drag level preset knob 120 in an intermediate drag level detent position, a linearly increasing drag level is provided as drag lever 130 is rotated from its minimum rotation position to its maximum rotation position at vertical dashed line 509, e.g., over the full angular rotation of drag lever 130, however, in the illustrated example, the drag level at the point of minimum rotation of drag lever 130 is typically small, and is preferably close to zero.

With drag level preset knob 120 in its maximum drag level detent position, there is a linearly increasing non-zero drag level as drag lever 130 is rotated from its minimum rotation position to its maximum rotation position as indicated by the vertical dashed line 509, e.g., over the full angular rotation of drag lever 130, however, in the illustrated example, the drag level at the point of minimum rotation of drag lever 130 may be substantial due to the action of preset knob 120 setting a non-zero minimum drag level.

In a fishing reel 10 including a frame 20, a spool 50 rotatably mounted on a shaft 60 in the frame 20, and a crank handle 70 for rotating the spool 50, a drag system 100, 200, 300 may comprise: a drag housing 310 having a base 312 and a wall 314 extending therefrom to define an axial cavity 316; a driver member 220 rotatable with the spool 50; a driven member 320 disposed adjacent the cavity 316 of drag housing 310 and rotatable relative to drag housing 310; wherein one of drag housing 310 and driven member 320 is engagable with driver member 220 to rotate with spool 50 and the other of drag housing 310 and driven member 320 is fixed rotationally relative to the shaft 60; a drag stack of washers 330, 340 in the cavity 316 of drag housing 310 between drag housing 310 and driven member 320, drag stack 330, 340 including a plurality of friction washers 330, 340 including a friction imparting material and at least one metal washer 340, 330; wherein the friction washers 330, 340 are keyed to one of drag housing 310 and driven member 320, and wherein the at least one metal washer 340, 330 is keyed to the other of drag housing 310 and driven member 320; a cam 140 and follower 150 actuatable for moving one of driven member 320 and driver member 220 axially to engage and disengage the other of driven member 320 and driver member 220, and to bias drag stack 330, 340 for pressing the washers 330, 340 thereof together for exhibiting friction; and an actuator 120, 130 movable for actuating cam 140 and follower 150 for moving one of driver member 220 and driven member 320 axially to engage and disengage. Drag housing 310 may be attached to shaft 60 to rotate therewith and friction washers 330, 340 may engage drag housing 310 to rotate with shaft 60. Drag housing 310 may have key slots 317 in the wall 314 thereof and friction washers 330 may have ears 337 engaging the key slots 317. Driven member 320 may have a non-circular boss 326 extending axially therefrom, and the at least one metal washer 340 may have a non-circular opening 346 therein that engages the non-circular boss 326 of driven member 320. Friction washers 330 may have an opening 332 through which the boss 326 of driven member 320 passes without engaging the friction washers 330. Fishing reel drag system 100, 200, 300 may further comprise at least one dog 360 and a ratchet 44, wherein dog 360 engages ratchet 44 for inhibiting rotation of the shaft 60 in one direction. Driven member 320 may have a keying opening 323 therein and driver member 220 may have a keying projection 222 extending axially therefrom that selectively engages keying opening 323 of driven member 320, and driver member 220 may be movable axially on shaft 60 relative to spool 50. A spring 240 may be for biasing driver member 220 toward driven member 320. Shaft 60 may couple axial movement of follower 150 to axially move driven member 320. A spring 170 may be for biasing the shaft 60 toward driven member 320 for pressing the washers of drag stack 330, 340 together for exhibiting friction. Actuator 120, 130 may include a drag lever 130 rotatable for rotating cam 140 relative to follower 150, and may include a preset knob 120 rotatable for rotating an adjusting screw 160 relative to follower 150. Preset knob 120 may be rotatable in detented steps for rotating adjusting screw 160 in steps relative to follower 150.

In a fishing reel 10 including a frame 20, a spool 50 rotatably mounted on a shaft 60 in the frame 20, and a crank handle 70 for rotating the spool 50, a drag system 100, 200, 300 may comprise: a drag housing 310 having a base 312 and a wall 314 extending therefrom to define an axial cavity 316; a driver member 220 rotatable with spool 50; a driven member 320 disposed adjacent the cavity 316 of drag housing 310 and rotatable relative to drag housing 310; wherein driven member 320 is engagable with driver member 220 to rotate with spool 50 and drag housing 310 is fixed rotationally relative to the shaft 60; a drag stack of washers 330, 340 in the cavity 316 of drag housing 310 between drag housing 310 and driven member 320, drag stack 330, 340 including a plurality of friction washers 330, 340 including a friction imparting material and at least one metal washer 340, 330; wherein friction washers 330 are keyed to drag housing 310 and wherein the at least one metal washer 340 is keyed to driven member 320; a cam 140 and follower 150 actuatable for moving driver member 220 axially to engage and disengage driven member 320 and to bias drag stack 330, 340 for pressing washers 330, 340 thereof together for exhibiting friction; and an actuator 120, 130 movable for actuating cam 140 and follower 150 for moving driver member 220 axially to engage and disengage driven member 320. Drag housing 310 may have key slots 317 in wall 314 thereof and friction washers 330 may have ears 337 engaging key slots 317. Driven member 320 may have a non-circular boss 326 extending axially therefrom, and the at least one metal washer 340 may have a non-circular opening 346 therein that engages non-circular boss 326 of driven member 320. Friction washers 330 may have an opening 332 through which boss 326 of driven member 320 passes without engaging the friction washers 330. Reel 10 may include at least one dog 360 and a ratchet 44, wherein the dog 360 engages the ratchet 44 for inhibiting rotation of the shaft 60 in one direction. Driven member 320 may have a keying opening 323 therein and driver member 220 may have a keying projection 222 extending axially therefrom that selectively engages the keying opening 323 of driven member 320. Driver member 220 may be movable axially on the shaft 60 relative to the spool 50. A spring 240 may be for biasing driver member 220 toward driven member 320. Shaft 60 may couple axial movement of follower 150 to axially move driven member 320. A spring 170 may be for biasing the shaft 60 toward driven member 320 for pressing the washers of drag stack 330, 340 together for exhibiting friction. Actuator 120, 130 may include a drag lever 130 rotatable 60 for rotating cam 140 relative to follower 150, and may include a preset knob 120 rotatable for rotating an adjusting screw relative to follower 150. Preset knob 120 may be rotatable in detented steps for rotating adjusting screw 160 in steps relative to follower 150.

In a fishing reel 10 including a frame 20, a spool 50 rotatably mounted on a shaft 60 in the frame 20, and a crank handle 70 for rotating the spool 50, a drag system 100, 200, 300 may comprise: a drag housing 310 having a base 312 and a wall 314 extending therefrom to define an axial cavity 316, wherein drag housing 310 is fixed rotationally relative to one of the shaft 60 and the spool 50; a driven member 320 disposed adjacent the cavity 316 of drag housing 310 and rotatable relative to drag housing 310, wherein driven member 320 is rotatable with the other of the shaft 60 and the spool 50; a drag stack of washers 330, 340 in the cavity 316 of drag housing 310 between drag housing 310 and driven member 320, drag stack 330, 340 including a plurality of friction washers 330, 340 including a friction imparting material and at least one metal washer 340, 330; wherein the friction washers 330, 340 are keyed to one of drag housing 310 and driven member 320, and wherein the at least one metal washer 340, 330 is keyed to the other of drag housing 310 and driven member 320; a cam 140 and follower 150 actuatable for moving driven member 320 axially to bias drag stack 330, 340 for pressing the washers 330, 340 thereof together for exhibiting friction; a spring 170 coupled to cam 140 and follower 150 for applying bias to drag stack 330, 340 for producing a desired level of friction; and an actuator 120, 130 movable for actuating cam 140 and follower 150 for moving one of driver member 220 and driven member 320 axially. Spring 170 may include a plurality of Belleville washers 170. Driven member 320 may be in the cavity 316 of drag housing 310, which may further comprise a retainer 350 attached to drag housing 310 for retaining drag stack 330, 340 and driven member 320 in drag housing 310. Drag housing 310, retainer 350, drag stack 330, 340 and driven member 320 may define a cartridge 300 removable from fishing reel 10 as a unit. Drag housing 310 may have key slots 317 in wall 314 thereof and friction washers 330 may have ears 337 engaging key slots 317. Driven member 320 may have a non-circular boss 326 extending axially therefrom, and the at least one metal washer 340, 330 may have a non-circular opening 346 therein that engages the non-circular boss 326 of driven member 320. Friction washers 330, 340 may have an opening 332 through which the boss 326 of driven member 320 passes without engaging the friction washers 330, 340.

A fishing reel 10 drag system cartridge 300 may comprise: a drag housing 310 having a base 312 and a wall 314 extending therefrom to define an axial cavity 316; a driven member 320 disposed adjacent the cavity 316 of drag housing 310 and rotatable relative to drag housing 310; a drag stack of washers 330, 340 in the cavity 316 of drag housing 310 between drag housing 310 and driven member 320, drag stack 330, 340 including a plurality of friction washers 330, 340 including a friction imparting material and at least one metal washer 340, 330; wherein friction washers 330, 340 are keyed to one of drag housing 310 and driven member 320, and wherein the at least one metal washer 340, 330 is keyed to the other of drag housing 310 and driven member 320; and a retainer 350 attached to drag housing 310 for retaining drag stack 330, 340 and driven member 320 therein. Drag housing 310 may have key slots 317 in the wall 314 thereof and friction washers 330, 340 may have ears 337 engaging key slots 317. Driven member 320 may have a non-circular boss 326 extending axially therefrom, and the at least one metal washer 340, 330 may have a non-circular opening 346 therein that engages non-circular boss 326 of driven member 320. Friction washers 330, 340 may have an opening 332 through which boss 326 of driven member 320 passes without engaging friction washers 330, 340.

As used herein, the term "about" means that dimensions, sizes, formulations, parameters, shapes and other quantities and characteristics are not and need not be exact, but may be approximate and/or larger or smaller, as desired, reflecting tolerances, conversion factors, rounding off, measurement error and the like, and other factors known to those of skill in the art. In general, a dimension, size, formulation, parameter, shape or other quantity or characteristic is "about" or "approximate" whether or not expressly stated to be such. It is noted that embodiments of very different sizes, shapes and dimensions may employ the described arrangements.

Further, what may be stated as being "optimum" or "deemed optimum" may or not be a true optimum condition, but may the condition deemed to be "optimum" by virtue of its being selected, e.g., in the case of a fishing reel 10, by the particular user of the fishing reel 10 and his or her desired settings and preferences. The present arrangement may advantageously provide for a wide range of drag settings, drag ranges, and drag levels, thereby to accommodate a wide range of fishers.

While the present invention has been described in terms of the foregoing example embodiments, variations within the scope and spirit of the present invention as defined by the claims following will be apparent to those skilled in the art. For example, the geared interface 88 between main gear 80 and shaft 60 may be provided by gear teeth on shaft 60 as illustrated, or may be provided by a pinion gear on shaft 60, as may be convenient for providing a desired gearing ratio between handle 70 and spool 50. And main gears and pinion gears may be changed to provide a different gearing ratio as may be desired.

While the drag housing 310 is described as having keying slots 317 that engage ears 337 of friction washers 330, drag housing 310 could have projections that engage slots in friction washers 330, or could employ another keying arrangement. Similarly any keying arrangement could be employed between driven member 320 and metal washers 340. Alternatively, friction washers 330 could be keyed to driven member 320 and metal washers 340 could be keyed to drag housing 310, if desired.

Further, ratchet 44 and dogs 360 could be interchanged so that the ratchet is on drag housing 310 and the dogs are on left side plate 40.

Finally, numerical values stated are typical or example values, are not limiting values, and do not preclude substantially larger and/or substantially smaller values. Values in any given embodiment may be substantially larger and/or may be substantially smaller than the example or typical values stated. For example, The diameters of drag housing 310, of washers 330 and 340, and of driver member 320, may be increased or decreased, as may be appropriate for obtaining larger or smaller annular contact areas for generating frictional drag.

What is claimed is:

1. In a fishing reel including a frame, a spool rotatably mounted on a shaft in the frame, and a crank handle for rotating the spool, a drag system comprising:
   a drag housing having a base and a wall extending therefrom to define an axial cavity;
   a driver member rotatable with the spool;
   a driven member disposed adjacent the cavity of said drag housing and rotatable relative to said drag housing;
   wherein one of said drag housing and said driven member is engagable with said driver member to rotate with said spool and the other of said drag housing and said driven member is fixed rotationally relative to the shaft;
   a drag stack of washers in the cavity of said drag housing between said drag housing and said driven member, said drag stack including a plurality of friction washers including a friction imparting material and at least one metal washer;
   wherein the friction washers are keyed to one of said drag housing and said driven member, and wherein the at least one metal washer is keyed to the other of said drag housing and said driven member;
   a cam and follower actuatable for moving one of said driven member and said driver member axially to engage and disengage the other of said driven member and said driver member, and to bias said drag stack for pressing the washers thereof together for exhibiting friction; and
   an actuator movable for actuating said cam and follower for moving said one of said driver member and driven member axially to engage and disengage,
   wherein the friction washers and the at least one metal washer do not rotate relative to each other when said driver member and said driven member are disengaged.

2. The fishing reel drag system of claim 1 wherein said drag housing is attached to the shaft to rotate therewith and wherein the friction washers engage said drag housing to rotate with said shaft.

3. The fishing reel drag system of claim 2 wherein said drag housing has key slots in the wall thereof and wherein the friction washers have ears engaging the key slots.

4. The fishing reel drag system of claim 2 wherein said driven member has a non-circular boss extending axially therefrom, and wherein the at least one metal washer has a non-circular opening therein that engages the non-circular boss of said driven member.

5. The fishing reel drag system of claim 4 wherein the friction washers have an opening through which the boss of said driven member passes without engaging the friction washers.

6. The fishing reel drag system of claim 1 further comprising at least one dog and a ratchet, wherein the dog engages the ratchet for inhibiting rotation of the shaft in one direction.

7. The fishing reel drag system of claim 1 wherein said driven member has a keying opening therein and wherein said driver member has a keying projection extending axially therefrom that selectively engages the keying opening of said driven member.

8. The fishing reel drag system of claim 7 wherein said driver member is movable axially on the shaft relative to the spool.

9. The fishing reel drag system of claim 8 further comprising a spring for biasing said driver member toward said driven member.

10. The fishing reel drag system of claim 1 wherein the shaft couples axial movement of said follower to axially move said driven member.

11. The fishing reel drag system of claim 1 further comprising a spring for biasing the shaft toward said driven member for pressing the washers of said drag stack together for exhibiting friction.

12. The fishing reel drag system of claim 1 wherein said actuator includes a drag lever rotatable for rotating said cam relative to said follower.

13. The fishing reel drag system of claim 1 wherein said actuator includes a preset knob rotatable for rotating an adjusting screw relative to said follower.

14. The fishing reel drag system of claim 13 wherein said preset knob is rotatable in detented steps for rotating said adjusting screw in steps relative to said follower.

15. In a fishing reel including a frame, a spool rotatably mounted on a shaft in the frame, and a crank handle for rotating the spool, a drag system comprising:
   a drag housing having a base and a wall extending therefrom to define an axial cavity;
   a driver member rotatable with the spool;
   a driven member disposed adjacent the cavity of said drag housing and rotatable relative to said drag housing;
   wherein said driven member is engagable with said driver member to rotate with said spool and said drag housing is fixed rotationally relative to the shaft;
   a drag stack of washers in the cavity of said drag housing between said drag housing and said driven member, said drag stack including a plurality of friction washers including a friction imparting material and at least one metal washer;
   wherein the friction washers are keyed to said drag housing and wherein the at least one metal washer is keyed to said driven member;
   a cam and follower actuatable for moving said driver member axially to engage and disengage said driven member and to bias said drag stack for pressing the washers thereof together for exhibiting friction; and
   an actuator movable for actuating said cam and follower for moving said driver member axially to engage and disengage said driven member,
   wherein the friction washers and the at least one metal washer do not rotate relative to each other when said driver member and said driven member are disengaged.

16. The fishing reel drag system of claim 15 wherein said drag housing has key slots in the wall thereof and wherein the friction washers have ears engaging the key slots.

17. The fishing reel drag system of claim 15 wherein said driven member has a non-circular boss extending axially therefrom, and wherein the at least one metal washer has a non-circular opening therein that engages the non-circular boss of said driven member.

18. The fishing reel drag system of claim 17 wherein the friction washers have an opening through which the boss of said driven member passes without engaging the friction washers.

19. The fishing reel drag system of claim 15 further comprising at least one dog and a ratchet, wherein the dog engages the ratchet for inhibiting rotation of the shaft in one direction.

20. The fishing reel drag system of claim 15 wherein said driven member has a keying opening therein and wherein said driver member has a keying projection extending axially therefrom that selectively engages the keying opening of said driven member.

21. The fishing reel drag system of claim 20 wherein said driver member is movable axially on the shaft relative to the spool.

22. The fishing reel drag system of claim 21 further comprising a spring for biasing said driver member toward said driven member.

23. The fishing reel drag system of claim 15 wherein the shaft couples axial movement of said follower to axially move said driven member.

24. The fishing reel drag system of claim 15 further comprising a spring for biasing the shaft toward said driven member for pressing the washers of said drag stack together for exhibiting friction.

25. The fishing reel drag system of claim 15 wherein said actuator includes a drag lever rotatable for rotating said cam relative to said follower.

26. The fishing reel drag system of claim 15 wherein said actuator includes a preset knob rotatable for rotating an adjusting screw relative to said follower.

27. The fishing reel drag system of claim 26 wherein said preset knob is rotatable in detented steps for rotating said adjusting screw in steps relative to said follower.

28. In a fishing reel including a frame, a spool rotatably mounted on a shaft in the frame, and a crank handle for rotating the spool, a drag system comprising:
a drag housing having a base and a wall extending therefrom to define an axial cavity, wherein said drag housing is fixed rotationally relative to one of the shaft and the spool;
a driven member disposed adjacent the cavity of said drag housing and rotatable relative to said drag housing, wherein said driven member is rotatable with the other of the shaft and the spool;
a drag stack of washers in the cavity of said drag housing between said drag housing and said driven member, said drag stack including a plurality of friction washers including a friction imparting material and at least one metal washer;
wherein the friction washers are keyed to one of said drag housing and said driven member, and wherein the at least one metal washer is keyed to the other of said drag housing and said driven member;
a cam and follower actuatable for moving said driven member axially to bias said drag stack for pressing the washers thereof together for exhibiting friction;
a spring coupled to said cam and follower for applying bias to said drag stack for producing a desired level of friction; and
an actuator movable for actuating said cam and follower for moving said one of said driver member and driven member axially,
wherein the friction washers and the at least one metal washer do not rotate relative to each other when said driver member and said driven member are disengaged.

29. The fishing reel drag system of claim 28 wherein said spring includes a plurality of Belleville washers.

30. The fishing reel drag system of claim 28 wherein said driven member is in the cavity of said drag housing, further comprising a retainer attached to said drag housing for retaining said drag stack and said driven member in said drag housing.

31. The fishing reel drag system of claim 28 wherein said drag housing, said retainer, said drag stack and said driven member define a cartridge removable from said fishing reel as a unit.

32. The fishing reel drag system of claim 28 wherein said drag housing has key slots in the wall thereof and wherein the friction washers have ears engaging the key slots.

33. The fishing reel drag system of claim 28 wherein said driven member has a non-circular boss extending axially therefrom, and wherein the at least one metal washer has a non-circular opening therein that engages the non-circular boss of said driven member.

34. The fishing reel drag system of claim 33 wherein the friction washers have an opening through which the boss of said driven member passes without engaging the friction washers.

35. A fishing reel drag system cartridge comprising:
a drag housing having a base and a wall extending therefrom to define an axial cavity;
a drag stack of washers in the axial cavity of said drag housing adjacent the base of said drag housing, said drag stack of washers including a plurality of friction washers including a friction imparting material and at least one metal washer;
a driven member disposed adjacent said drag stack of washers in the cavity of said drag housing, wherein said drag stack of washers is between said driven member and the base of said drag housing, said driven member including a central axial projection extending through openings in washers of said drag stack of washers,
wherein the friction washers are keyed to one of said drag housing and the central axial projection of said driven member, and wherein the at least one metal washer is keyed to the other of said drag housing and the central axial projection of said driven member; and
a retainer attached to said drag housing for rotatably retaining said driven member in said drag housing, wherein said driven member retains said drag stack of washers in the cavity of said drag housing;
wherein said driven member includes a keying feature accessible through said retainer for engaging a keying feature of a driver for causing said driven member to rotate relative to said drag housing and for applying a force axially to said driven member, wherein said driven member does not rotate relative to said drag housing when said driven member is not engaging the driver; and
wherein said driven member is rotatable relative to said drag housing for imparting relative rotation between the friction washers and the at least one metal washer of said drag stack of washers, and
wherein said driven member is movable axially relative to said drag housing for pressing the friction washers and the at least one metal washer of said drag stack of washers together for exhibiting friction.

36. The fishing reel drag system of claim 35 wherein said drag housing has key slots in the wall thereof and wherein the friction washers have ears engaging the key slots.

37. The fishing reel drag system of claim 35 wherein the central axial member of said driven member includes a non-circular boss extending axially, and wherein the at least one metal washer has a non-circular opening therein that engages the non-circular boss of said driven member.

38. The fishing reel drag system of claim 37 wherein the friction washers have an opening through which the boss of said driven member passes without engaging the friction washers.

39. The fishing reel drag system of claim 35 wherein said retainer has a circular opening, and wherein said driven member has a circular base and flange for rotatably engaging said retainer at the circular opening thereof.

* * * * *